United States Patent
Pu

(10) Patent No.: US 8,552,598 B2
(45) Date of Patent: Oct. 8, 2013

(54) LINEAR VIBRATING MOTOR

(75) Inventor: Yong-Hua Pu, Shenzhen (CN)

(73) Assignees: AAC Acoustic Technologies (Shenzhen) Co., Ltd., Shenzhen (CN); American Audio Components Inc., La Verna, CA (US)

( * ) Notice: Subject to any disclaimer, the term of this patent is extended or adjusted under 35 U.S.C. 154(b) by 290 days.

(21) Appl. No.: 12/978,573

(22) Filed: Dec. 26, 2010

(65) Prior Publication Data

US 2011/0187209 A1 Aug. 4, 2011

(30) Foreign Application Priority Data

Feb. 1, 2010 (CN) ...................... 2010 2 9216030 U

(51) Int. Cl.
*H02K 33/04* (2006.01)

(52) U.S. Cl.
USPC .............................. 310/15; 310/17

(58) Field of Classification Search
USPC ........... 310/14–155; 340/384.1, 384.7, 388.1, 340/396; 381/396, 398, 431
See application file for complete search history.

(56) References Cited

U.S. PATENT DOCUMENTS

| | | | | |
|---|---|---|---|---|
| 4,050,066 A | * | 9/1977 | Yanagisawa et al. | 340/388.1 |
| 4,330,878 A | * | 5/1982 | Nakamura | 368/250 |
| 5,861,686 A | * | 1/1999 | Lee | 310/36 |
| 6,628,798 B2 | * | 9/2003 | Teshima et al. | 381/396 |
| 7,224,090 B2 | * | 5/2007 | Oh et al. | 310/14 |
| 7,550,885 B2 | * | 6/2009 | Takagi et al. | 310/81 |
| 7,615,901 B2 | * | 11/2009 | Young, II | 310/81 |

\* cited by examiner

*Primary Examiner* — Tran Nguyen
(74) *Attorney, Agent, or Firm* — IPro, Inc.; Na Xu

(57) ABSTRACT

A linear vibrating motor includes a base defining a first bottom wall and a first sidewall extending vertically from the first bottom wall, a cover forming a receiving cavity together with the base and defining a second bottom wall and a second sidewall extending vertically from the second bottom wall, a coil positioned on one of the first bottom wall and the second bottom wall, a vibrating unit suspended in the receiving cavity, a gasket positioned on a bottom wall of one of the base and the cover, and an elastic plate suspending the vibrating unit and sandwiched between the gasket and a sidewall of the other one of the base and the cover.

8 Claims, 1 Drawing Sheet

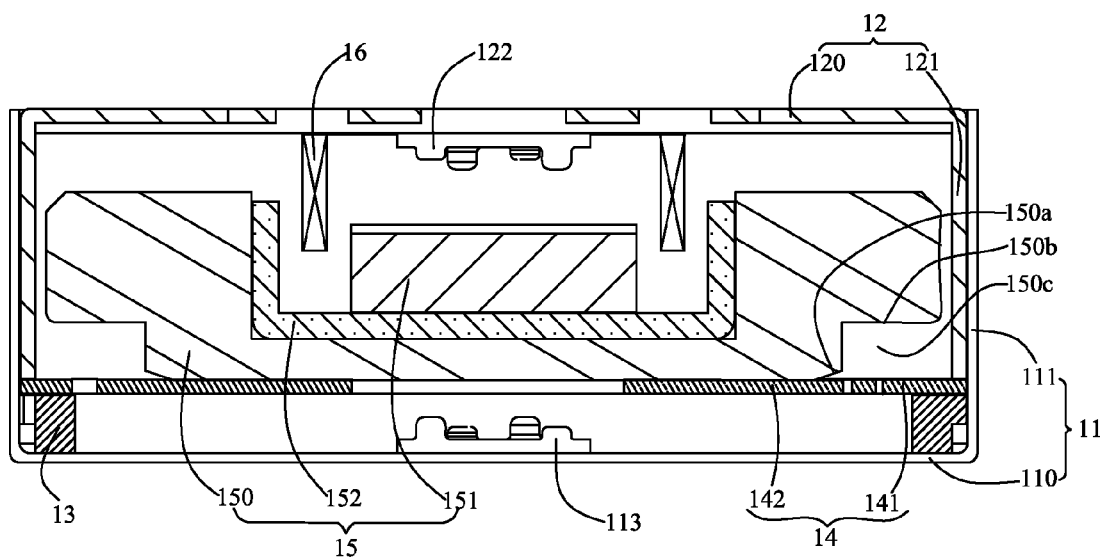

LINEAR VIBRATING MOTOR

FIELD OF THE INVENTION

The present invention generally relates to the art of vibrators and, more particularly, to a linear vibrating motor for generating tactile sensation.

DESCRIPTION OF RELATED ARTS

Consumer products, such as mobile phones and portable multi-media players, generally include vibrators for generating tactile feedback. For example, a mobile phone has a vibrator for generating vibration while a call is called in, and a portable multi-media player has a touch screen having vibrators for getting tactile feedback.

Generally, the vibrating motor comprises a cover, a hollow cylindrical base forming a receiving cavity together with a cover, an elastic plate located in the receiving cavity, and a vibrating unit suspended in the receiving cavity by the elastic plate. The vibrating unit typically includes a magnet and a weight attached to the magnet. The coil is positioned on the cover.

However, the elastic plate can not fix in the receiving cavity firmly, As a result, the vibrating motor has deteriorated endurance, and a shortened lifespan.

BRIEF DESCRIPTION OF THE DRAWING

FIG. 1 is cross-sectional view of a linear vibrating motor in accordance with an exemplary embodiment of the present invention.

DETAILED DESCRIPTION OF THE EXEMPLARY EMBODIMENT

Reference will now be made to describe the exemplary embodiment of the present invention in detail.

A linear vibrating motor is mounted on a printed circuit board of an electronic device for generating tactile vibration. Referring to FIG. 1, a linear vibrating motor 1, in accordance with an exemplary embodiment of the present invention, includes a base 12, and a cover 11 forming a receiving space together with the base 12. The cover 11 and the base 12 corporately form a housing having the receiving space. The housing accommodates an elastic plate 14, a vibrating unit 15, a gasket 13, and a coil 16. The base 12 defines a first bottom wall 120 and a first sidewall 121 extending vertically from the first bottom wall 120. The cover 11 comprises a second bottom wall 110 and a second sidewall 111 extending vertically from the second bottom wall 110. One of the first sidewall 121 and the second sidewall 111 wraps the other one. While assembled, the coil 16 is positioned on one of the first bottom wall 121 and the second bottom wall 111.

The vibrating body 15 includes a yoke 152, a weight 150, and a magnet 151. The weight 150 surrounds the yoke 152 for enhancing the vibrating amplitude of the vibrating unit 15. The magnet 151 is positioned to a central part of a bottom wall of the yoke 152. A magnetic gap is formed by an outer surface of the magnet 151 and an inner surface of the yoke 152. The coil 16 is partially received in the magnetic gap. Generally, the weight 150 is made of metal. In the exemplary embodiment, the vibrating unit includes the weight, the magnet and the yoke. In fact, the vibrating unit may include the magnet and the yoke without the weight.

While assembled, the coil 16 is partially located in the magnetic gap, and the vibrating unit 15 is suspended in the receiving space by the elastic plate 14. Preferably, the vibrating unit 15 is fully located above the elastic plate 14. When electrified, the vibrating unit 15 vibrates along a direction upright to the elastic plate 14.

The gasket 13 is positioned on a bottom wall of one of the base 12 and the cover 11, and the elastic plate 14 is sandwiched between the gasket 13 and a sidewall of the other of the base 12 and the cover 11. Another word, when the gasket 13 is positioned on the second bottom wall 110 of the cover 11, as shown in FIG. 1, the elastic plate 14 is sandwiched between the gasket 13 and the first sidewall 121 of the base 12. And when the gasket 13 is positioned on the first bottom wall 120 of the base 12, the elastic plate is sandwiched between the gasket 13 and the second sidewall 111 of the cover 11.

Preferably, the linear vibrating motor 1 further includes a first rubber 122 attached to the first bottom wall 120 for avoiding the bumping between the vibrating unit 15 and the base 12, and a second rubber 113 attached to the second bottom wall 110 of the cover 11 for avoiding bumping between the elastic plate 14 and the cover 11

When the vibrating unit 15 comprises the weight 150, the weight 150 defines a bevel 150$a$ extending from a first bottom surface sitting on the elastic plate 14. The bevel 150$a$ forms an acute angle with the elastic plate 14. Further, the weight 150 defines a second bottom surface 150$b$ far away from the elastic plate 14 for forming a depression 150$c$ therebetween. Thereby, during vibration of the vibrating unit, interference between the elastic plate 14 and the weight 150 is reduced.

While the present invention has been described with reference to a specific embodiment, the description of the invention is illustrative and is not to be construed as limiting the invention. Various of modifications to the present invention can be made to the exemplary embodiment by those skilled in the art without departing from the true spirit and scope of the invention as defined by the appended claims.

What is claimed is:

1. A linear vibrating motor, comprising:
a base defining a first bottom wall and a first sidewall extending vertically from the first bottom wall;
a cover forming a receiving cavity together with the base, the cover including a second bottom wall and a second sidewall extending vertically from the second bottom wall;
a coil positioned on one of the first bottom wall and the second bottom wall;
a vibrating unit suspended in the receiving cavity;
a gasket positioned on a bottom wall of one of the base and the cover; and
an elastic plate suspending the vibrating unit and being sandwiched between the gasket and a sidewall of the other one of the base and the cover.

2. The linear vibrating motor as described in claim 1, wherein one of the first sidewall and the second sidewall wraps the other one.

3. The linear vibrating motor as described in claim 1, wherein the vibrating unit locates fully above the elastic plate.

4. The linear vibrating motor as described in claim 1, wherein the vibrating unit comprises a weight sitting on the elastic plate.

5. The linear vibrating motor as described in claim 4, wherein the weight defines a bevel extending from a first bottom surface sitting on the elastic plate and the bevel forms an acute angle with the elastic plate.

6. The linear vibrating motor as described in claim 5, wherein the weight further defines a second bottom surface far away from the elastic plate 14 for forming a depression therebetween.

7. The linear vibrating motor as described in claim 1 further comprising a first rubber on the first bottom wall.

8. The linear vibrating motor as described in claim 7 further comprising a second rubber on the second bottom wall.

* * * * *